United States Patent [19]

Cerny et al.

[11] 4,092,460
[45] May 30, 1978

[54] COMPOSITIONS INTENDED FOR THE FLAMEPROOFING OF PLASTICS

[75] Inventors: Jacqueline Cerny; Gilbert Vivant, both of Lyon, France

[73] Assignee: Rhone-Poulenc Industries, Paris, France

[21] Appl. No.: 690,844

[22] Filed: May 28, 1976

[30] Foreign Application Priority Data

Jun. 10, 1975 France .............................. 75 18039

[51] Int. Cl.² .......................... C08K 3/02; C08L 1/10
[52] U.S. Cl. .................... 428/407; 260/17 R; 260/42.14; 260/42.56; 260/45.7 P; 260/836; 260/844; 260/851; 260/857 UN; 260/859 R; 260/862; 260/897 R; 260/900; 260/901; 260/DIG. 24; 427/221
[58] Field of Search ............... 260/17 R, 42.14, 42.56, 260/45.7 P, 836, 844, 851, 857 UN, 859 R, 862, 897 R, 900, 901, DIG. 24, 326.26; 427/221; 428/407

[56] References Cited

U.S. PATENT DOCUMENTS

| 3,336,155 | 8/1967 | Rowe | 428/407 |
|---|---|---|---|
| 3,386,851 | 6/1968 | Harlan | 427/221 |
| 3,627,780 | 12/1971 | Bonnard et al. | 260/326.26 |
| 3,691,195 | 9/1972 | Sambeth et al. | 260/326.26 |
| 3,883,475 | 5/1975 | Racky et al. | 260/45.75 E |
| 3,897,586 | 7/1975 | Coker | 428/407 |

OTHER PUBLICATIONS

Kirk-Othmer-Encyclopedia of Chem. Techn. (2nd ed.) (vol. 13) (Interscience) (N.Y.) (1967), pp. 440, 441, & 443.
Knapsack-Chem. Abs. 71, 50805c (1969).
Vollbracht-Chem. Abs. 72, 112687x (1970).
Dany et al.-Chem. Abs. 75, 118977a (1971).
Modern Plastics Encyclopedia 74–75 (McGraw-Hill) (N.Y.) (Oct. 1974), pp. 554–555.

*Primary Examiner*—Donald E. Czaja
*Assistant Examiner*—H. H. Fletcher
*Attorney, Agent, or Firm*—McDougall, Hersh & Scott

[57] ABSTRACT

Compositions for flameproofing plastics without the release of toxic products during use in which compositions consist of a pulverulent mixture containing from 50 to 95% by weight of red phosphorous and from 5 to 50% by weight of polymers having unsaturated malenoid, fumaroid or allyl bonds.

12 Claims, No Drawings

COMPOSITIONS INTENDED FOR THE FLAMEPROOFING OF PLASTICS

The present invention relates to compositions, based on red phosphorous, for flameproofing plastics.

Red phosphorous, in addition to various applications such as a coating for a match-striking surface, i also used as a flameproofing agent for plastics. However, this application is restricted by the dangers encountered, such as pollution hazards, and difficulties in using the material with full safety. Red phosphorous is a very good flameproofing agent because, for a given activity, it can be used in a much smaller amount than, for example, the halogen derivatives. Furthermore, its use in plastics results in better mechanical properties and does not interfere with the electrical properties of the plastics.

It is known, from French Pat. No. 2,052,784, to use red phosphorous, in a proportion of 0.5 to 15%, as a flameproofing agent for molding compositions based on glass fiber-filled polyamides.

However, red phosphorous used by itself, directly in plastic molding compositions, suffers from the disadvantage that it is in the form of particles which present the hazard of igniting easily, for example in the presence of hot surfaces or under the influence of pressure.

To deal with these disadvantages, it has been proposed, according to French Pat. No. 2,074,394 (British Pat. No. 1,326,929) to incorporate into the thermoplastic, which may be reinforced with glass fibers, red phosphorous impregnated with a lactam containing 4 to 12 carbon atoms, for example caprolactam, in a proportion of 1 to 20% relative to the weight of the polymer.

However, the essential disadvantage of this process is the hygroscopic nature of the lactams and the fact that the presence of water in the mixture causes the formation of phosphine, which is very toxic and ignites spontaneously in air, especially at temperatures at which polymers are processed.

German Patent Application No. 2,308,104 describes compositions of thermoplastics flameproofed with red phosphorous and containing metal oxides to prevent evolution of phosphine in the course of storage at ambient temperature. However, the addition of metal oxides is insufficient to prevent the evolution of phosphine at high temperatures.

It was thus necessary, and it is an object of this invention, to find a means which makes it possible to employ red phosphorous without the hazard of phosphine evolution essentially due to the use temperature and to the presence of small amounts of water in the polymers being molded.

It has now been found that this objective can be achieved if use is made of compositions intended for flameproofing plastics consisting of a pulverulent mixture comprising:

(a) from 50 to 95% by weight of red phosphorous in the particulate form, such as a powder, and (b) from 5 to 50% by weight of one or more prepolymers or polymers having chains containing malenoid, fumaroid or allyl unsaturated bonds.

Red phosphorous is to be understood to include all the colored allotropic varieties which are sold commercially under the name red phosphorous and which can contain up to 3% of metal oxides or metal salts as stabilizers.

The red phosphorous must be in the form of particles having a mean diameter of less than 200 $\mu$ and preferably less than 100 $\mu$. The use of particles which are only a few microns in diameter makes it possible to flameproof spun articles for textile usage.

Compounds having malenoid, fumaroid or allyl unsaturated bonds in their chain are essentially represented by prepolymers or polymers of the unsaturated polyester or polyimide type, or copolymer based on maleic anhydride or on esters of maleic or fumaric acid.

Unsaturated polyesters containing malenoid, fumaroid or allyl unsaturated bonds are well known; they are described, in particular, in the "Encyclopedia of Polymer Science and Technology", Volume 11, page 129 et seq. (Interscience Publishers). Among these polyesters there may be mentioned, inter alia, poly(diol fumarates) in solution in styrene, in allyl phthalate or in methyl methacrylate, as well as polymers based on allyl phthalate.

Copolymers based on maleic anhydride or on esters of maleic acid or fumaric acid are also well known; they are described in the same work as above, Volume 1, page 80 et seq.

The prepolymers of the polyimide type are non-crosslinked or not fully crosslinked reaction products of a N,N'-bis-imide of an unsaturated dicarboxylic acid, having the general formula:

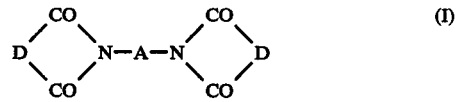

in which D represents a divalent organic radical containing a carbon-carbon double bond and A is a divalent organic radical possessing 2 to 30 carbon atoms.

The prepolymers or polymers obtained by reaction of a compound of the formula I and a polyamine are described in French Pat. No. 1,555,564 (British Pat. No. 1,190,718). In formula I, D is derived from an anhydride of an ethylenic dicarboxylic acid of the general formula:

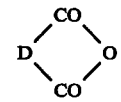

which is preferably maleic anhydride or dichloromaleic anhydride. The poly-bis-maleimides, prepared in accordance with French Pat. No. 1,455,514 (U.S. Pat. No. 3,380,964), are also suitable.

Depending on their physical form, all these polymers can, if they are liquid, be deposited on the surface of the phosphorous particles by any known means or, if they are solid, be mixed intimately, in the form of a powder, (with the phosphorous particles) by any known method of homogenization of powders.

It is known furthermore that the addition of metal oxides or metal salts stabilizes red phosphorous and are usually present in red phosphorous sold commercially. The addition of metal oxides, which makes it possible to reduce possible evolution of phosphine, is included within the scope of the invention. The metal oxides which give the best results, when used in the practice of this invention, are the oxides of copper, zinc, silver, iron, antimony, vanadium, tin, titanium or magnesium, but preferably copper oxide.

The amounts of metal oxides used can vary depending upon the amount of resin used, the conditions of use of the synthetic resins, as well as the nature of these synthetic resins. Usually, metal oxides can be employed in amounts up to 100% by weight, relative to the red phosphorous.

Many synthetic polymers are used to obtain shaped articles which more and more frequently must be flameproofed. Numerous compositions based on thermoplastic polymers, thermosetting polymers or elastomeric polymers can be flameproofed according to the invention. Amongst the thermoplastic polymers, mention can be made of the polyolefines, such as high or low density polyethylenes, polypropylene, polyfluoroethylenes and ethylene-propylene copolymers; the polyvinyl compounds such as polyvinyl chloride or copolymers of vinyl chloride; the polystyrenes and acrylonitrile-butadiene-styrene copolymers, the polyamides such as poly(hexamethylene adipamide), polycaprolactam, poly(hexamethylene sebacamide), polyundecanamide, polylauryllactam and poly(hexamethylene azelamide); the saturated polyesters, such as poly(ethylene glycol terephthalates) or poly(butylene glycol terephthalates); the polycarbonates; the polyacetals; the polyacrylic compounds such as poly(methyl methacrylate); the cellulose esters, and the polyurethanes or polyamide-imides.

Amongst the thermosetting polymers benefited, there may be mentioned the phenolic resins, the aminoplasts, the unsaturated polyesters, the polyepoxides and the polyimides.

Various elastomers can also be flameproofed using the compositions according to the invention. For example, the natural or synthetic rubbers, the silicones and the polyurethane elastomers.

All these plastics, when intended especially for producing shaped articles, are usually employed with various adjuvants, namely, reinforcing fillers such as glass fibers; fillers intended to impart specific characteristics to the shaped articles, or inert fillers such as kaolin or talc; antioxidants, various stabilizers, dyestuffs or pigments.

A content of flameproofing composition of 0.2 to 20% by weight relative to the plastic is usually employed to obtain a suitable flameproof effect.

EXAMPLE 1

40 g of a prepolymer obtained by reaction of 2.5 mols of 4,4'-bis-maleimido-diphenylmethane and 1 mol of 4,4'-diamino-diphenylmethane, and having a softening point of 100° C, are dissolved in 100 cm³ of dimethylformamide. 60 g of a red phosphorous powder having a particle size of between 20 and 30 $\mu$ are added while stirring. The mixture is stirred for 10 minutes and is then left standing for 12 hours.

The suspension of phosphorous is then run into a mixture of 1 liter of methanol and 2 liters of water stirred very vigorously by means of a turbine. The suspension is filtered and the product is washed with 200 cm³ of methanol and then rinsed with twice 200 cm³ of ether. It is dried and 88 g of red phosphorous powder on which the resin has been deposited are obtained.

25.6 g of coated red phosphorous and 300 g of poly(hexamethylene adipamide), having a mean molecular weight of 20,000 and an inherent viscosity in meta-cresol of 1.3, are introduced into a jacketed one liter autoclave equipped with a spiral scraper-type stirrer revolving at 20 rpm and heated by a heating fluid. The mixture is heated gradually, while stirring, so that it reaches a temperature of 285° C in about 1 hour. It is maintained at this temperature for 1 hour.

Any phosphine which may be evolved is determined. For this purpose the gases leaving the autoclave are trapped in two 1,000 cm³ flasks in series, containing 750 cm³ of a 2% aqueous solution of mercuric chloride, and the acid formed is determined in the presence of methyl orange.

This method of determination has been described by WILMET in "Comptes rendus de l'Academie des Sciences" 185 (1927), page 206.

The weight of phosphine evolved is 1.4 mg per 1 g of red phosphorous employed.

A blank experiment, carried out under the same conditions, except that 18 g of uncoated red phosphorous is used instead of coated red phosphorous, gives an evolution of phosphine of 33.5 mg per gram of red phosphorous employed.

To test the flameproofing produced by the red phosphorous and polyimide, slabs of size 100 mm × 6 mm, and of 3 mm thickness, are prepared by cold sintering under a pressure of 300 kg/cm².

The limiting oxygen index is measured by the LOI test in accordance with Standard Specification ASTM D2863.

The following results are obtained:

|  | LOI test |
|---|---|
| Polyamide alone | 20.8 |
| Polyamide + red phosphorous | 27 – 28 |

EXAMPLE 2

40 g of 4,4'-bis-maleimido-diphenylmethane are dissolved in 150 cm³ of dimethylformamide. 60 g of a red phosphorous powder having a particle size of between 20 and 30 $\mu$ are poured in gradually, while stirring. The mixture is stirred for 5 minutes, to give a homogeneous suspension. This suspension is poured into a mixture of 1 liter of methanol and 2 liters of water, stirred very vigorously by means of a turbine.

The product is filtered off, washed with 200 cm³ of methanol and then rinsed twice with 200 cm³ of ether. It is dried, and 97 g of red phosphorous powder on which 4,4'-bis-maleimido-diphenylmethane has been deposited are obtained.

Thereafter, the procedure indicated in Example 1 is followed, with 29.1 g of red phosphorous prepared above. The 4,4'-maleimido-diphenylmethane is cross-linked to a polyimide at the use temperature. A very slight evolution of phosphine, of 0.9 mg per gram of red phosphorous employed, is observed.

The LOI test is carried out as in Example 1. An index of 27.5–28 is obtained.

EXAMPLES 3 AND 4

The procedure of Examples 1 and 2 is followed, but in each experiment 6 g of copper oxide are added to the autoclave.

No evolution whatsoever of phosphine is observed.

EXAMPLE 5

11.1 g of 4,4'-bis-maleimido-diphenylmethane powder and 18 g of red phosphorous powder are intimately mixed. Thereafter, the procedure in the autoclave is carried out as in Example 1. An evolution of phosphine of 3.9 mg per gram of red phosphorous employed is observed.

EXAMPLE 6

Use is made of a single-screw laboratory extruder, in which the screw has a length of 415 mm and a diameter of 15 mm. This extruder is equipped with a cylindrical die having a diameter of 3 mm. The barrel temperatures are as follows: 250° C at the material inlet, 280° C at the center and 270° C at the die.

The following composition is prepared by simple mixing: 100 g of poly(hexamethylene adipamide) having a mean molecular weight of 20,000 and an inherent viscosity, in meta-cresol, of 1.3, 9.8 g of red phosphorous coated in accordance with Example 2 and 2 g of copper oxide powder.

This composition is introduced into the extruder and a strand is extruded.

During the entire operation, tests were made for the possible presence of phosphine in various parts of the extruder by means of a DRAEGER CH 31,101 tube.

Similarly, attempts are made to detect phosphine when the strand which has just been extruded, and which is still hot, is broken.

All these tests are negative; not the slightest trace of phosphine is detected.

EXAMPLE 7

The following ingredients are mixed in a revolving drum: 88 g of poly(tetramethylene glycol terephthalate) in the form of granules (viscosity 3,500 poises), 0.3 g of Cepretol (a polyalkylene glycol laurate), 2 g of copper oxide powder and 9.8 g of red phosphorous coated in accordance with Example 2.

This mixture is introduced into the extruder used for Example 6 and is extruded as strands. The barrel temperatures are modified as follows: 215° C at the material inlet, 240° C at the center and 235° C at the die. No evolution whatsoever of phosphine is detected. The LOI test gave an index of 23–23.5 (polyester alone = 21).

EXAMPLE 8

The procedure of Example 7 is followed, except that the poly(tetramethylene glycol terephthalate) is replaced by the same amount of polypropylene powder (d = 0.903, melting point 165° – 170° C, melt index = 6). The extrusion barrel temperatures are respectively 205° C, 220° C and 205° C. The LOI test gave an index of 19 – 19.5 (polypropylene alone = 17).

EXAMPLE 9

The procedure of Example 7 is followed, except that the poly(tetramethylene glycol terephthalate) is replaced by the same amount of polystyrene powder (VICAT temperature 96° C, d = 1.05, melt index at 200°/5 kgs: 4–4.5). Extrusion barrel temperatures are respectively: 220° C, 240° C and 230° C. The LOI test is carried out. An index of 22 – 23 is obtained (polystyrene alone = 20).

In all the tests, a strand of good quality is obtained and no evolution whatsoever of phosphine is detected.

We claim:

1. Compositions intended for flameproofing plastics, which compositions do not evolve toxic products when use is made of the plastics, characterized in that said compositions consist of a pulverulent mixture comprising:
    (a) 50 to 95% by weight of red phosphorous in particulate form, having a mean particle size of less than 200 μ, and
    (b) 5 to 50% by weight of at least one polymer or prepolymer which contains malenoid, fumaroid or allyl unsaturated bonds and in which the particles of red phosphorous are coated with the polymer or prepolymer.

2. Compositions as claimed in claim 1 in which the polymer of prepolymer (b) are polymers or copolymers obtained from the group consisting of maleic anhydride, maleic acid esters, and fumaric acid esters.

3. Compositions as claimed in claim 1 in which the polymer or prepolymer (b) are polyimides containing N,N'-bis-maleimide groups.

4. Compositions as claimed in claim 3 in which the polymer or prepolymer (b) is a 4,4'-bis-maleimido-diphenylmethane.

5. Compositions as claimed in claim 1 which contain up to 100% by weight, relative to the red phosphorous, of a metal oxide selected from the group consisting of the oxides of copper, zinc, silver, iron, antimony, vanadium, tin, titanium or magnesium.

6. A flameproofed plastic comprising a plastic and 0.2 to 20% by weight relative to the plastic of a flame proofing agent which does not evolve toxic products when use is made of the plastic comprising 50 to 95% by weight of red phosphorous in particulate form and 5 to 50% by weight of a polymer or prepolymer which contains malenoid, fumaroid, or allyl unsaturated bonds.

7. A flameproofed plastic as claimed in claim 6, in which the flame proofing agent is uniformly distributed throughout the plastic as fine particles having a mean diameter of less than 200 microns.

8. A flameproofed plastic as claimed in claim 6, in which the flame proofing agent is uniformly distributed throughout the plastic as fine particles having a mean diameter of less than 100 microns.

9. A flameproofed plastic as claimed in claim 6, in which the polymer or prepolymer is admixed with the red phosphorous.

10. A flameproofed plastic as claimed in claim 6, in which the polymer or prepolymer is present as a coating on the particles of red phosphorous.

11. A flameproofed plastic as claimed in claim 6, in which an oxide of a metal selected from the group consisting of copper, zinc, silver, iron, antimony, vanadium, tin, titanium and magnesium is present in the flame proofing agent in an amount up to the amount of red phosphorous.

12. A flameproofed plastic as claimed in claim 6, in which the flame proofing agent consists of 50 to 95 parts by weight of red phosphorous to 5 to 50 parts by weight of the polymer or prepolymer.

* * * * *